United States Patent
Ould et al.

(10) Patent No.: US 9,664,495 B2
(45) Date of Patent: May 30, 2017

(54) METHOD OF FINDING A FEATURE USING A MACHINE TOOL

(71) Applicant: RENISHAW PLC, Wotton-Under-Edge, Gloucestershire (GB)

(72) Inventors: John Ould, Blackwell Farleigh (GB); Kevin Tett, Bristol (GB)

(73) Assignee: RENISHAW PLC, Wotton-under-Edge (GB)

( * ) Notice: Subject to any disclaimer, the term of this patent is extended or adjusted under 35 U.S.C. 154(b) by 119 days.

(21) Appl. No.: 14/391,822

(22) PCT Filed: Apr. 16, 2013

(86) PCT No.: PCT/GB2013/050966
§ 371 (c)(1),
(2) Date: Oct. 10, 2014

(87) PCT Pub. No.: WO2013/156767
PCT Pub. Date: Oct. 24, 2013

(65) Prior Publication Data
US 2015/0101204 A1   Apr. 16, 2015

Related U.S. Application Data

(60) Provisional application No. 61/720,307, filed on Oct. 30, 2012.

(30) Foreign Application Priority Data

Apr. 18, 2012 (EP) .................................... 12250095

(51) Int. Cl.
*G01B 7/012* (2006.01)
*G01B 21/04* (2006.01)

(52) U.S. Cl.
CPC .......... *G01B 7/012* (2013.01); *G01B 21/045* (2013.01)

(58) Field of Classification Search
CPC ......... G01B 7/012; G01B 7/008; G01B 5/008
(Continued)

(56) References Cited

U.S. PATENT DOCUMENTS 4,084,323 A   4/1978   McMurtry
4,153,998 A   5/1979   McMurtry
(Continued)

FOREIGN PATENT DOCUMENTS

CN   85105480 A   1/1987
CN   1392950 A    1/2003
(Continued)

OTHER PUBLICATIONS

Apr. 7, 2015 Office Action issued in Taiwanese Patent Application No. 102113861.
(Continued)

*Primary Examiner* — Christopher Fulton
(74) *Attorney, Agent, or Firm* — Oliff PLC

(57) ABSTRACT

A method of finding a feature of an object using an analogue probe mounted on a machine tool. The method includes the analogue probe and/or object following a course of motion which causes the analogue probe's surface sensing region to traverse across the feature to be found a plurality of times whilst approaching the feature over successive traverses so as to ultimately arrive in a position sensing relationship with the feature so as to collect scanned measurement data about the feature along at least part of a traverse.

24 Claims, 4 Drawing Sheets

Figure 1:
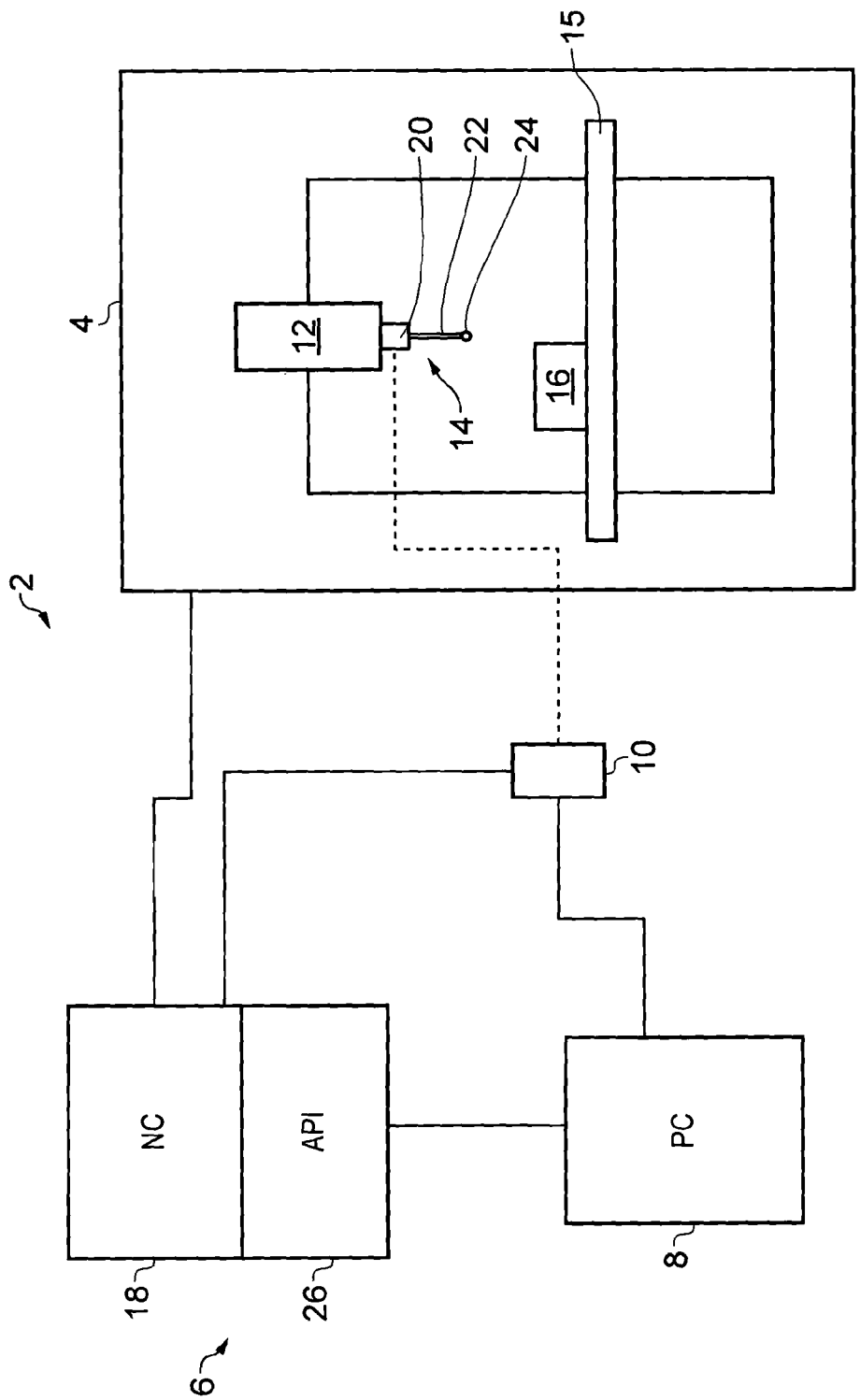

(58) Field of Classification Search
USPC .......................................................... 33/503
See application file for complete search history.

(56) References Cited

U.S. PATENT DOCUMENTS

| | | | | |
|---|---|---|---|---|
| 4,166,323 | A * | 9/1979 | Maag | G01B 7/283 |
| | | | | 33/501.9 |
| 4,799,170 | A | 1/1989 | Nakaya et al. | |
| 4,991,304 | A | 2/1991 | McMurtry | |
| 5,115,401 | A | 5/1992 | Oyama et al. | |
| 5,189,806 | A * | 3/1993 | McMurtry | G01B 21/04 |
| | | | | 33/503 |
| 5,428,548 | A | 6/1995 | Pilborough et al. | |
| 5,471,406 | A | 11/1995 | Breyer et al. | |
| 6,580,964 | B2 * | 6/2003 | Sutherland | G01B 21/042 |
| | | | | 700/193 |
| 7,100,430 | B2 | 9/2006 | Samsavar et al. | |
| 7,146,291 | B2 | 12/2006 | Hough | |
| 7,165,335 | B2 | 1/2007 | McMurtry | |
| 7,254,506 | B2 * | 8/2007 | McMurtry | G01B 21/045 |
| | | | | 33/502 |
| 7,293,365 | B2 | 11/2007 | McMurtry et al. | |
| 7,318,284 | B2 | 1/2008 | McMurtry et al. | |
| 7,523,561 | B2 | 4/2009 | McFarland | |
| 7,543,393 | B2 * | 6/2009 | McMurtry | G01B 21/042 |
| | | | | 33/502 |
| 7,752,000 | B2 | 7/2010 | Schulze et al. | |
| 7,866,056 | B2 | 1/2011 | Ould et al. | |
| 7,886,453 | B2 * | 2/2011 | Ould | G01B 21/042 |
| | | | | 33/503 |
| 7,900,367 | B2 * | 3/2011 | Sutherland | G01B 21/042 |
| | | | | 33/502 |
| 8,006,398 | B2 | 8/2011 | McFarland et al. | |
| 8,006,402 | B2 | 8/2011 | Yoshizumi et al. | |
| 8,756,973 | B2 * | 6/2014 | Wallace | G01B 21/045 |
| | | | | 73/1.79 |
| 8,991,246 | B2 * | 3/2015 | Hirono | G01B 5/008 |
| | | | | 33/503 |
| 9,366,519 | B2 * | 6/2016 | Danbury | G01B 5/008 |
| 9,400,178 | B2 | 7/2016 | Marshall et al. | |
| 2001/0047682 | A1 | 12/2001 | Samsavar et al. | |
| 2003/0019119 | A1 | 1/2003 | Sato et al. | |
| 2004/0244464 | A1 | 12/2004 | Hajdukiewicz et al. | |
| 2005/0005688 | A1 | 1/2005 | Samsavar et al. | |
| 2005/0194534 | A1 | 9/2005 | Kneedler et al. | |
| 2005/0263727 | A1 | 12/2005 | Noda | |
| 2007/0050089 | A1 | 3/2007 | Sun et al. | |
| 2008/0051927 | A1 | 2/2008 | Prestidge et al. | |
| 2008/0249737 | A1 | 10/2008 | Jordil et al. | |
| 2009/0307916 | A1 | 12/2009 | McLean et al. | |
| 2010/0050837 | A1 | 3/2010 | Ould et al. | |
| 2010/0119104 | A1 | 5/2010 | Mamour et al. | |
| 2011/0184695 | A1 | 7/2011 | Grzesiak | |
| 2011/0264402 | A1 | 10/2011 | Anderson et al. | |
| 2011/0276303 | A1 | 11/2011 | Marshall et al. | |
| 2011/0283553 | A1 | 11/2011 | McFarland et al. | |
| 2012/0150354 | A1 | 6/2012 | Rogers et al. | |
| 2015/0101204 | A1 | 4/2015 | Ould et al. | |

FOREIGN PATENT DOCUMENTS

| | | |
|---|---|---|
| CN | 1474159 A | 2/2004 |
| CN | 1695036 A | 11/2005 |
| CN | 1727871 A | 2/2006 |
| CN | 101166951 A | 4/2008 |
| CN | 100437027 C | 11/2008 |
| CN | 100476348 C | 4/2009 |
| CN | 101622513 A | 1/2010 |
| CN | 101669009 A | 3/2010 |
| CN | 102197274 A | 9/2011 |
| DE | 19730471 A1 | 2/1999 |
| EP | 0 588 512 A1 | 3/1994 |
| EP | 1 260 789 A2 | 11/2002 |
| EP | 2102589 A1 | 9/2009 |
| GB | 2302589 A | 1/1997 |
| JP | H02-145908 A | 6/1990 |
| JP | H10-31084 A | 2/1998 |
| JP | 2005-345123 A | 12/2005 |
| JP | 2005-345165 A | 12/2005 |
| JP | 2005-537474 A | 12/2005 |
| JP | 2009-293992 A | 12/2009 |
| JP | 2010-513042 A | 4/2010 |
| JP | 2010-537184 A | 12/2010 |
| JP | 2012-011544 A | 1/2012 |
| TW | 200537070 | 11/2005 |
| TW | 200951464 A1 | 12/2009 |
| TW | 201111100 A1 | 4/2011 |
| WO | 90/07097 A1 | 6/1990 |
| WO | 92/20996 A1 | 11/1992 |
| WO | 03/012561 A2 | 2/2003 |
| WO | 2005/028996 A1 | 3/2005 |
| WO | 2005/031254 A1 | 4/2005 |
| WO | 2005/065884 A2 | 7/2005 |
| WO | 2006/003380 A1 | 1/2006 |
| WO | 2006/013387 A2 | 2/2006 |
| WO | 2006/115923 A2 | 11/2006 |
| WO | 2006/115923 A3 | 11/2006 |
| WO | 2008/074989 A1 | 6/2008 |
| WO | 2009/010721 A1 | 1/2009 |
| WO | 2012/037059 A1 | 3/2012 |

OTHER PUBLICATIONS

Apr. 7, 2015 Office Action issued in Taiwanese Application No. 102113861.
Apr. 20, 2015 Office Action issued in Taiwanese Application No. 102113862.
Aug. 8, 2014 Office Action and Search Report issued in Taiwanese Application No. 102113862.
"Scanning Systems for Reverse Engineering". Renishaw PLC. 1999.
"Installation Guide Renscan 200—Scanning System for Machine Tools". Renishaw PLC. 1997.
"Installation Guide Retroscan—Scanning System for Machine Tools". Renishaw PLC. 1996.
U.S. Appl. No. 14/391,950 in the name of Wooldridge et al., filed Oct. 10, 2014.
U.S. Appl. No. 14/391,837 in the name of McMurtry et al., filed Oct. 10, 2014.
Lee, K. H. et al. "A Framework for Laser Scan Planning of Freeform Surfaces." International Journal of Advanced Manufacturing Technology. vol. 17, pp. 171-180, 2001.
Elkott, Diaa et al. "Isoparametric line sampling for the inspection planning of sculptured surfaces." Computer-Aided Design. vol. 37, pp. 189-200, 2005.
Fernandez, Pedro et al. "Laser scan planning based on visibility analysis and space partitioning techniques." International Journal of Advanced Manufacturing Technology. vol. 39, pp. 699-715, 2008.
Jul. 17, 2012 Search Report issued in European Application No. 12 25 0093.
Jul. 25, 2013 International Search Report and Written Opinion issued in PCT Application No. PCT/GB2013/050964.
Sep. 1, 2014 Office Action issued in Taiwanese Application No. 102113860.
Jul. 18, 2012 Search Report issued in European Application No. 12 25 0095.
Jul. 25, 2013 International Search Report and Written Opinion issued in PCT Application No. PCT/GB2013/050966.
Sep. 1, 2014 Office Action issued in Taiwanese Application No. 102113861.
Jul. 25, 2013 International Search Report and Written Opinion issued in PCT Application No. PCT/GB2013/050968.
Jul. 19, 2012 Search Report issued in European Application No. 12 25 0096.
"Tracecut Powerful Software for the Mould and Die Industry," Renishaw Data Sheet H-2000-2293-04-A.
"Renscan Retrofit 'Closed Loop' Scanning System for Machine Tools," Renishaw Data Sheet Part No. H-2000-2068-03-A.

(56) References Cited

OTHER PUBLICATIONS

"Renscan 200 A Fast Retrofit Scanning System for Machine Tools," Renishaw Data Sheet Part No. H-2000-2068-PA.
Jul. 28, 2016 Office Action issued in Chinese Application No. 201380024772.2.
Jul. 12, 2016 Office Action Issued in U.S. Appl. No. 14/391,837.
Dec. 22, 2016 Office Action issued in Chinese Application No. 201380031456.8.
Jan. 26, 2017 Office Action issued in Chinese Application No. 201380027017.X.
Dec. 27, 2016 Office Action issued in Japanese Application No. 2015-506299.
Feb. 14, 2017 Office Action issued in Japanese Patent Application No. 2015-506298.
Mar. 28, 2017 Office Action issued in European Patent Application No. 13 719 596.2.
Feb. 14, 2017 Office Action issued in Japanese Patent Application No. 2015-506301.

* cited by examiner

METHOD OF FINDING A FEATURE USING A MACHINE TOOL

This invention relates to a method of finding an object, and in particular to a method of finding an object using a scanning measurement tool mounted on a coordinate positioning apparatus.

It is known to mount a measurement probe in a machine tool spindle, for movement with respect to a workpiece, in order to measure the workpiece. In practice, the probe has typically been a touch trigger probe, e.g. as described in U.S. Pat. No. 4,153,998 (McMurtry), which produces a trigger signal when a stylus of the probe contacts the workpiece surface. This trigger signal is taken to a so-called "skip" input of the machine tool's numeric controller (NC). In response, relative movement of the object and workpiece are stopped and the controller takes an instantaneous reading of the machine's position (i.e. the position of the spindle and the probe relative to the machine). This is taken from measurement devices of the machine such as encoders which provide position feedback information in a servo control loop for the machine's movement. A disadvantage of using such a system is that the measurement process is relatively slow resulting in long measurement times if a large number of measurement points are required.

Analogue measurement probes (also commonly known as scanning probes) are also known. Contact analogue probes typically comprise a stylus for contacting the workpiece surface, and transducers within the probe which measure the deflection of the stylus relative to the probe body. An example is shown in U.S. Pat. No. 4,084,323 (McMurtry). In use, the analogue probe is moved relative to the surface of the workpiece, so that the stylus scans the surface and continuous readings are taken of the outputs of the probe transducers. Combining the probe deflection output and the machine position output allows co-ordinate data to be obtained thereby allowing the position of the workpiece surface to be found at a very large number of points throughout the scan. Analogue probes thus allow more detailed measurements of the form of the workpiece surface to be acquired than is practically possible using a touch trigger probe.

It has been found desirable to be able to find features, such as edges, of a workpiece quickly using a probe mounted on a machine tool. Current techniques involve moving a probe to take a plurality of touch points at different locations around the feature (based on a nominal expected position of the feature). This is quite slow, especially when the feature's actual position deviates significantly from its expected nominal position.

The present invention provides an improved method for finding features, such as edges, of a workpiece using an analogue probe mounted on a machine tool.

According to a first aspect of the invention there is provided a method of finding a feature of an object using an analogue probe mounted on a machine tool, the method comprising the analogue probe and/or object following a course of motion which causes the analogue probe's surface sensing region to traverse across the feature to be found a plurality of times whilst approaching the feature over successive traverses so as to ultimately arrive in a position sensing relationship with the feature so as to collect scanned measurement data about the feature along at least part of a traverse.

Using the method of the invention, a feature such as the edge of a blade can be found quickly because the machine tool can simply cause the analogue probe and/or object to follow a predetermined course of motion until, for instance, scanned measurement data about the surface of the object is collected. This therefore negates the need for taking a plurality of discrete touch-trigger measurements which is time consuming.

The method can comprise monitoring for scanned measurement data according to at least one criterion being collected. Preferably, the method comprises halting movement along the course of motion in response to it being determined that scanned surface measurement data in accordance with at least one criterion has been collected.

The at least one criterion could be that the scanned surface measurement data meets a particular signature, e.g. that the analogue probe's output increases and then decreases. The at least one criterion can be a predetermined threshold indicative of the analogue probe obtaining a minimum level of data regarding the object. A minimum level of data can relate to a minimum quantity of data being obtained (e.g. a minimum number of data points being obtained). The minimum level of data can relate to a minimum magnitude of data being obtained/output by the analogue probe (e.g. in the case of an analogue probe a minimum extent of deflection). In other words, a minimum level of data can relate to the analogue probe obtaining at least one measurement greater than a predetermined value. Optionally, a minimum level of data can relate to a combination of quantity and value of data obtained by the analogue probe.

Movement along the course of motion could be halted immediately on determining that scanned surface measurement data in accordance with the at least one criterion has been collected. Optionally, movement along the course of motion could be halted at a later point in time or position. For instance, when the method comprises determining at predetermined intervals whether the analogue probe obtained scanned surface measurement data along the surface of the object in accordance with the at least one criterion (as explained in more detail below), the method could comprise completing predetermined movement until the next, or even a further subsequent, predetermined interval. Preferably the method comprises halting movement at some point after scanned surface measurement data in accordance with the at least one criterion has been collected. For example, the method could comprise controlling the analogue probe and/or object in accordance with the course of motion (e.g. such that the surface sensing region continues along its traverse) after the scanned surface measurement data in accordance with the at least one criterion has been collected, until a subsequent predetermined condition has been met. Such a subsequent predetermined condition could be a predetermined amount of time, and/or a predetermined distance. Optionally, such a subsequent predetermined condition could be a predetermined point, e.g. a predetermined point along the course of motion. For instance, the predetermined point could be the end of a traverse, more particularly the predetermined point can be the end of the traverse in which the first predetermined criterion was met. Optionally, the subsequent predetermined condition could be a predetermined interval (for example see below for more description on predetermined intervals). Optionally, such a subsequent predetermined condition could be a predetermined scenario, such as that the analogue probe is no longer collecting scanned surface measurement data (e.g. because it has moved out of a position sensing relationship with the object).

Movement can be halted immediately in response to it being determined that scanned surface measurement data in accordance with at least one second criterion has been collected. As with said at least one criterion, the at least one second criterion could take many different forms, e.g. could be a particular signature, quantity and/or magnitude of data, etc. For example, the at least one second criterion can relate to a minimum magnitude of data being obtained/output by the analogue probe. The magnitude of data could be one which is indicative of an undesirable positional relationship of the object and analogue probe, e.g. in the case of a non-contact probe the object and a part of the analogue probe (e.g. the workpiece sensing part) being at least too close to each other, thereby risking contact (in the case of a non-contact probe), or in the case of contact probe the probe's stylus being over deflected and/or too much force exerted on the probe's stylus, thereby risking damage to the object and/or analogue probe. For example, the at least one second criterion can be a threshold level of measurement indicative that the analogue probe has reached an upper measurement boundary (e.g. beyond which damage to the probe might occur). For example, in the case of an analogue contact probe, the at least one second criterion could comprise a level of deflection (e.g. beyond which damage might occur to the probe). As will be understood, the at least one second predetermined criterion is preferably configured such that the at least one first criterion will be met before the at least one second criterion is met/triggered. Accordingly, in the case in which the at least one criterion and at least one second criterion relate to magnitudes of data, the at least one second criterion can be a threshold magnitude that is greater than that of the at least one criterion. The method can comprise relatively retracting the analogue probe and object from each other in the event of the analogue probe collecting measurement data in accordance with the at least one second criterion.

The method could comprise continuously determining whether the analogue probe has obtained scanned surface measurement data, e.g. in accordance with the at least one first criterion. The method could comprise determining at predetermined intervals whether the analogue probe obtained scanned surface measurement data along the surface of the object in accordance with the at least one criterion. In this case, if it is determined at a predetermined interval that the analogue probe obtained scanned surface measurement data along the surface of the object in accordance with the at least one criterion, then motion along the course of motion could be halted. If it is determined at a predetermined interval that the analogue probe did not obtain scanned surface measurement data along the surface of the object in accordance with the at least one criterion, then motion along the course of motion could be continued to at least the next predetermined interval.

The analogue probe's output could be analysed for compliance with the at least one criterion, (e.g. compared to a predetermined threshold), only at the predetermined interval. Optionally, the analogue probe's output could be continuously analysed (e.g. compared to a predetermined threshold), or periodically analysed at other instances; for example between said predetermined intervals during the relative movement. Accordingly, in this case at the predetermined intervals it can simply be determined whether the prior occurred analysis indicated that the analogue probe obtained scanned surface measurement data in accordance with at least one criterion. The method could be configured such that at the predetermined intervals, the analogue probe's output collected prior to a predetermined interval is analysed to determine whether the analogue probe obtained scanned object measurement data, prior to resumption of relative movement along the course of motion. Movement could be continued along the course of motion until the next predetermined interval, even if the at least one criterion is met during the movement prior to said interval.

The predetermined intervals could be at predetermined (for example, regular) time intervals and/or at predetermined distance intervals, e.g. at predetermined locations along the length of the path.

The predetermined intervals can be configured such that the analogue probe's output is analysed to determine whether the analogue probe obtained scanned surface measurement data in accordance with at least one criterion, for each traverse. This analysis could be initiated after each traverse is completed. The analysis could be initiated, and optionally completed, before the next traverse is begun. In particular, the analysis could be initiated for each traverse after the point at which it is expected the analogue probe would have obtained scanned surface measurement data in accordance with at least one criterion, for example, at the end of each traverse.

Accordingly, the predetermined intervals could be at the end of each traverse. Accordingly, if it is determined that scanned surface measurement data in accordance with at least one criterion has not been collected, then the method can comprise continuing along the course of motion such that a subsequent, different, traverse of the object is performed.

Movement in accordance with the course of motion can continue until the next predetermined interval, even if scanned surface measurement data in accordance with at least one criterion has been collected during the movement leading up to said interval. Accordingly, this can ensure that data regarding the object is collected even after scanned surface measurement data in accordance with at least one criterion has been collected. This can be useful when subsequently processing the measurement data to determine information regarding the object, such as its location and/or orientation.

As will be understood, the surface sensing region of an analogue probe can be the region in space in which the analogue probe can detect/sense the surface of the object, and hence collect measurement data about the object. As will be understood, this will vary from probe to probe. In the case of a contact probe, this can comprise the surface contacting part of the probe (e.g. the stylus tip of an analogue probe having a stylus). In the case of a non-contact probe, it can be the point, area or volume in space in which the non-contact probe can sense and measure the surface.

The form of the course of motion the analogue probe and object move along relative to each other across the feature of the object can be substantially identical for each traverse. The analogue probe and object can move closer to each other after each traverse in a step-wise manner.

As will be understood, an analogue probe will have a given measurement range. This will vary from probe to probe. The measurement range could be the total range over which the probe can obtain measurements. For example, in connection with a contact probe, this could be the total range of deflections over which the probe can obtain measurement data. The difference between previous and subsequent traverses could be configured to be sufficiently small such that if along the previous traverse no surface measurement data was obtained, the subsequent traverse will not cause the analogue probe to obtain object surface measurement data that exceeds its measurement range. Optionally, traverses are offset from each other in steps that are no bigger than, and for example are smaller than, the measurement range of the probe.

The analogue probe could comprise a preferred measuring range. The preferred measuring range can be less than the given/total measuring range of the analogue probe. The analogue probe might be able to obtain data outside its preferred measurement range, but the data obtained outside this range could be less preferred, for instance because it could be considered to be less accurate than the data obtained within the preferred measuring range. In the case of a contact probe, the preferred measuring range can be less than the total deflection range of the analogue probe. Accordingly, the preferred measuring range could be a subset of the analogue probe's entire measurement range. The exact boundaries of the preferred measurement range can vary from probe to probe and even from measurement operation to measurement operation for any given probe. It could be the range for which the analogue probe has been calibrated for any given measurement operation, e.g. to give a desired level of accuracy. The difference between previous and subsequent traverses could be configured to be sufficiently small such that if along the previous traverse no surface measurement data was obtained, the subsequent traverse will not cause the analogue probe to obtain object surface measurement data that exceeds its preferred measuring range. Optionally, traverses are offset from each other in steps that are no bigger than, and for example are smaller than, the preferred measuring range of the probe.

The method can comprise determining whether the analogue probe obtained measurement data that met the at least one criterion based solely on the data from the analogue probe. This can be simpler and much more efficient than taking into consideration data from other parts of the machine, such as the data from machine encoders reporting the position of the probe itself within the machine tool's coordinate space. This is useful, as this can reduce the processing resources needed and/or time taken to determine whether to continue or subsequently halt movement along the path.

The method can further comprise determining the location and/or orientation of the object based on the measurement data obtained. This can comprise combining data obtained from the analogue probe with data regarding the position of the analogue probe within the machine tool's workspace. Such analogue probe position data could, for instance, be obtained from position encoders located on the machine tool apparatus.

The analogue probe could be a non-contact analogue probe, for instance an optical, capacitance or inductance probe. The analogue probe can be a contact analogue probe. For instance, the analogue probe could be a contact analogue probe with a deflectable stylus for contacting the object.

The method can further comprise generating a subsequent course of motion, along which an analogue probe and the object are moved relative to each other, for subsequent measurement of the object based on the measurement data. The analogue probe used during the subsequent course of motion could be the same analogue probe that was used during the previous course of motion to find the feature.

The course of motion could be defined in a program. The program could be loaded into a controller which is configured to control the relative motion of the analogue probe and object in accordance with the program.

The method could comprise issuing an interrupt signal in response to (either immediately or at a later point in time as described above) determining that scanned surface measurement data in accordance with at least one criterion has been collected. The controller could be configured to stop executing the part of the program that controls the course of motion between the analogue probe and object in response to the interrupt signal. Optionally, the method could comprise setting a variable on determination that scanned surface measurement data in accordance with at least one criterion has been collected. This could cause the controller at some subsequent point to stop executing the part of the program that controls the course of motion.

As will be understood, the method can comprise continuing along said course of motion if it is determined that the analogue probe has not obtained scanned measurement data along the surface of the object in accordance with at least one criterion.

The entire course of motion could be predetermined. The method could comprise moving the analogue probe and object relative to each other in accordance with the predetermined course of motion without deviation from said course of motion. Optionally, the course of motion could be updated during movement along the course of motion.

As mentioned above, the method comprises the analogue probe's surface sensing region traversing across the object a plurality of times. Optionally, the form of the course of motion the analogue probe and object take can be substantially identical for each traverse. For instance, both the previous and subsequent passes could comprise moving the analogue probe and object relative to each other in a straight line in order to cause the analogue probe's surface sensing region to traverse across the feature to be found. The course of motion can be configured such that the path of the surface sensing region for a subsequent traverse is offset from its previous traverse. For instance, the nominal relative offset between a part of the analogue probe (e.g. the workpiece sensing part such as a workpiece contact tip) and the object can be different, and in particular can be nominally less, for the subsequent pass. The analogue probe and object can move closer to each other after each traverse, e.g. in a step-wise manner. However, as will be understood, this need not necessarily be the case, and for instance the analogue probe and object can progressively move closer/approach each other along each traverse.

Initially the analogue probe and object can be sufficiently far away from each other such that the analogue probe is not in a position sensing relationship relative to the feature/object.

The object could be an object that was (and/or is to be) machined on the machine on which the analogue probe is mounted. Accordingly, the method could comprise, the same machine tool machining the object, for example prior to the above described measuring steps. Optionally machining could take place after the above described measuring steps. Such post-measurement machining could take place on the same machine tool on which the measurement occurred. Such post-measurement machining could be based on measurement data obtained during the above described measurement steps. The machine tool could be a cutting machine, such as a metal cutting machine.

The analogue probe could be a sealed analogue probe. That is the analogue probe could be sealed so as to protect internal sensor componentry from external contaminants. For instance, the probe could comprise a probe body which houses a sensor for either directly or indirectly measuring the surface of an object, in which the sensor is sealed from external contaminant. For instance, in the case of a contact probe, the probe could comprise a probe body, a stylus member and a sensor for measuring displacement of the stylus member relative to the housing, in which at least a first compliant sealing member is provided which extends between the probe body and relatively moveable stylus member, such that the sensor is contained within a sealed chamber and thereby sealed from external contaminants.

The object can be a blade, and the feature can be an edge of the blade. For instance, the blade could be a blade of a turbine engine.

The method can further comprise generating a course of motion, along which the analogue probe and object are moved relative to each other, for subsequent measurement of the object based on the measurement data. Generating a course of motion can comprise altering a pre-existing program and/or altering data referred to by the program, which together define the course of motion. Generating a course of motion can comprise generating a new program, which in conjunction with data referred to by the program defines the course of motion.

The method can comprise repeating above mentioned the steps of the method of the invention for a different feature of the object to obtain scanned measurement data of the different feature of the object. This can provide further, useful information about the location and/or orientation of the object.

According to a second aspect of the invention there is provided a computer program comprising instructions which when executed by a machine tool apparatus causes the machine tool apparatus to perform the above described method.

According to a third aspect of the invention there is provided a computer readable medium comprising instructions which when executed by a machine tool apparatus causes the machine tool apparatus to perform the above described method.

According to a fourth aspect of the invention there is provided a machine tool apparatus comprising a machine tool, an analogue probe mounted on the machine tool, and a controller configured to control the relative movement of the analogue probe and an object to find a feature of an object, the controller in particular being configured to control the analogue probe and/or object to follow a course of motion which causes the analogue probe's surface sensing region to traverse across the feature to be found a plurality of times whilst approaching the feature over successive traverses so as to ultimately arrive in a position sensing relationship with the feature so as to collect scanned measurement data about the feature along at least part of a traverse.

Accordingly, this application also describes a method of finding an object using an analogue probe mounted on a machine tool, the method comprising the analogue probe and/or object following a path which is configured to move the feature of the object and the analogue probe relative to each other, in which at predetermined intervals it is determined whether the analogue probe obtained scanned measurement data along the surface of the object that exceeds a predetermined threshold indicative of the analogue probe obtaining a minimum level of data regarding the object, and subsequently taking action based on the result of said determination.

Determining whether the analogue probe obtained scanned object measurement data and exceeded a predetermined threshold value at predetermined intervals, means that the analysis can be performed at appropriate points in the scanning operation, which can aid efficiency of the process and usefulness of data collected.

Figure 2A:
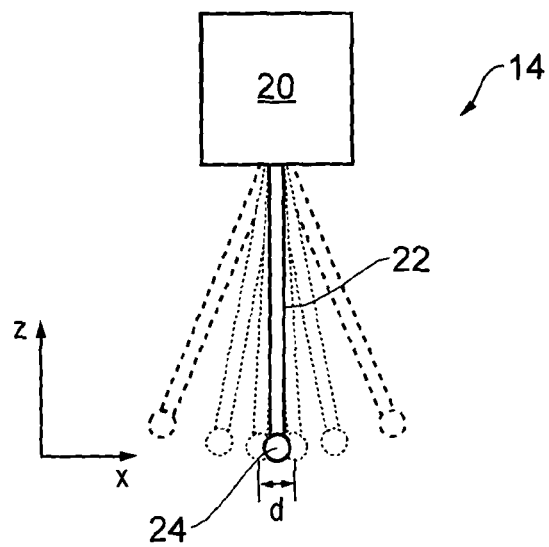
Figure 2B:
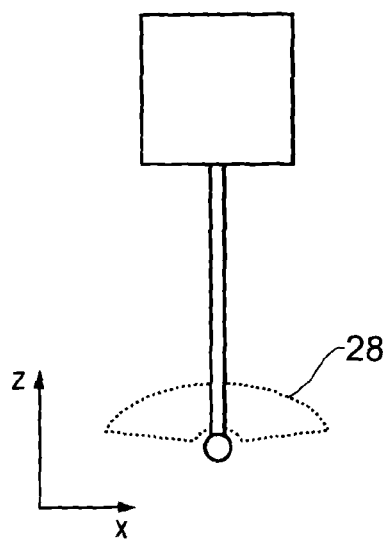
Figure 2C:
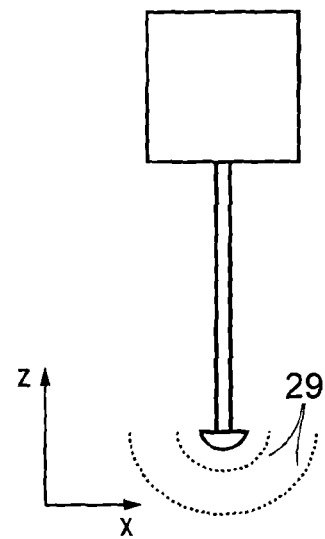
Figure 3:
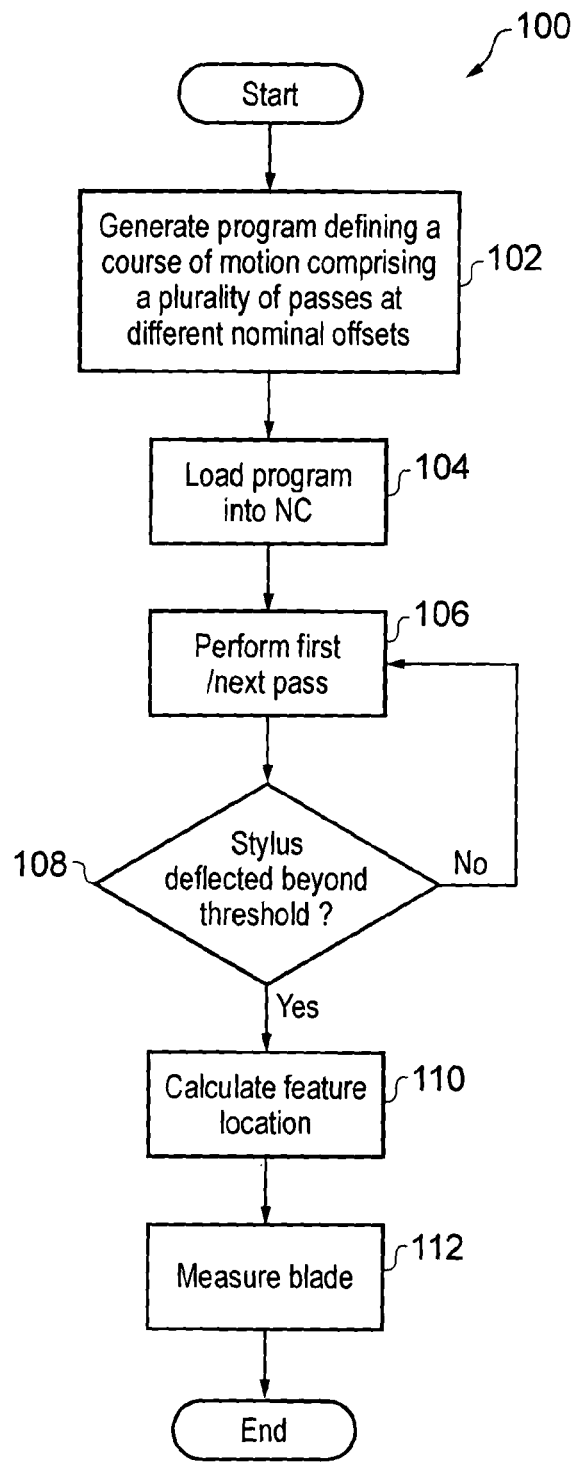
Figure 4:
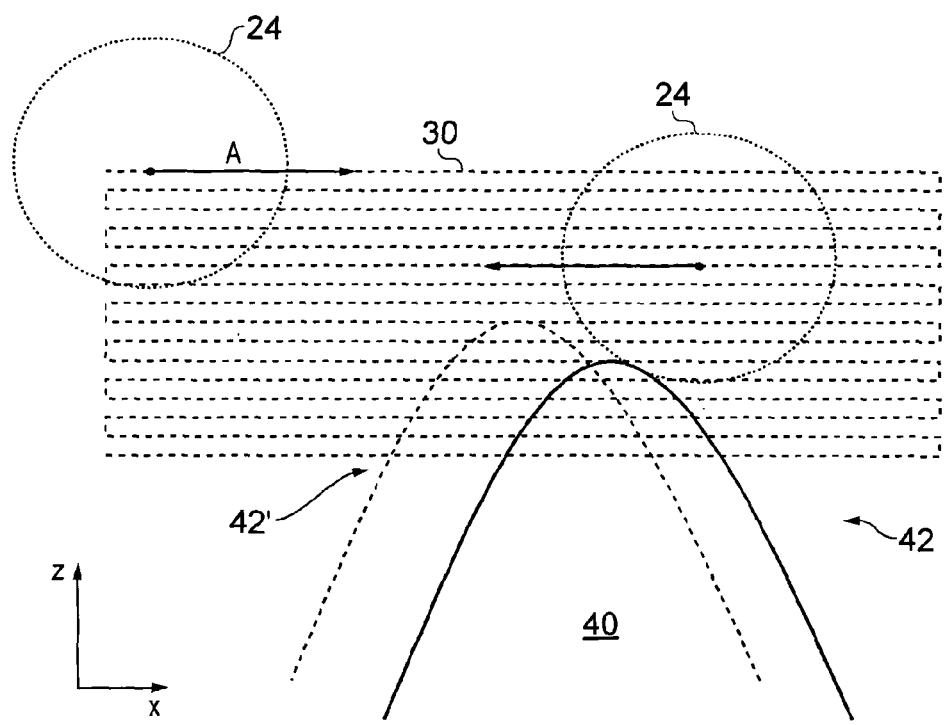
Figure 5:
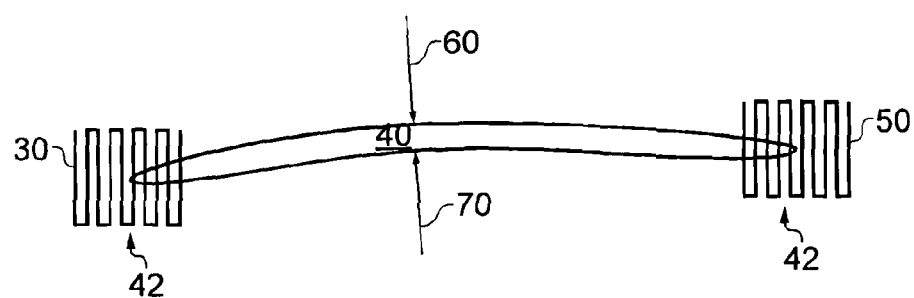

Embodiments of the invention will now be described, by way of example only, with reference to the following drawings in which:

FIG. 1 is a schematic diagram showing the system architecture for a machine tool;

FIGS. 2(a) to (c) are schematic diagrams illustrating the measurement range of analogue measurement probes;

FIG. 3 is a system flow chart illustrating the flow of control during a measurement operation according to an embodiment of the invention;

FIG. 4 schematically illustrates the course of movement for a probe tip during an method of finding a feature of an object according to the invention; and FIG. 5 schematically illustrates finding both ends, as well as taking other measurement points on a blade.

Referring to FIG. 1, there is shown a machine tool apparatus 2 comprising a machine tool 4, a controller 6, a PC 8 and a transmitter/receiver interface 10. The machine tool 4 comprises motors (not shown) for moving a spindle 12 which holds an analogue probe 14 relative to a workpiece 16 located on a table 15. The location of the spindle 12 (and hence the analogue probe 14) is accurately measured in a known manner using encoders or the like. Such measurements provide spindle position data defined in the machine co-ordinate system (x, y, z). A numerical controller (NC) 18 (which is part of the controller 6) controls x, y, z movement of the spindle 12 within the work area of the machine tool and also received data relating to the spindle position.

As will be understood, in alternative embodiments relative movement in any or all of the x, y and z dimensions could be provided by movement of the table 15 relative to the spindle. Furthermore, relative rotational movement of the analogue probe 14 and workpiece 16 could be provided by a part of the spindle 12 (e.g. a rotating/articulated head mounted on the spindle) and/or a part of table 15 (e.g. a rotary table). Furthermore, movement might be restricted to fewer dimensions, e.g. only x, and/or y. Further still, the embodiment described comprises a Cartesian machine tool, whereas will be understood this need not necessarily be the case and could be instance be a non-Cartesian machine tool. Further still, many other different types of machine tools, including lathes, and parallel-kinematic machines, and robot arms are known and could be used with the invention.

In the embodiment described, the analogue probe 14 is a contact analogue probe which comprises a probe body 20, a workpiece contacting stylus 22 extending from the probe body 20, and has a surface sensing region in the form of a workpiece contacting tip 24 (which in this case in the form of a spherical stylus ball) at the distal end of the stylus 22. The analogue probe 14 measures deflection of the stylus 22 in a probe geometry system (a, b, c). (However, as will be understood, this need not necessarily be the case, and for instance the analogue probe could measure deflection in only 1 or 2 dimensions, or even provide an output indicative of the extent of deflection, without any indication of the direction of deflection). The probe 14 also comprises a transmitter/receiver (not shown) that wirelessly communicates with the transmitter/receiver interface 10 (e.g. via a radio, optical or other wireless transmission mechanism).

As mentioned above, analogue measurement probes have a limited measuring range. For instance with regard to contact analogue probes, they can have a physical maximum amount by which they can be deflected in the x, y and z dimensions. Not only this, but it can be that the probe is configured such that it works optimally within a certain sub-range of the maximum physical range. For instance, FIG. 2(a) illustrates the analogue probe of FIG. 1, and the solid line represents the position of the stylus 22 at a rest (e.g. undeflected) position. The outermost stylus positions shown in dashed lines represent the maximum physical deflection of the stylus in the x-dimension. However, it could be that the probe is configured such that it is most accurate when the stylus is deflected by an amount less than the maximum physical deflection. It could also be that the probe is configured such that it is most accurate when the stylus is deflected by a minimum lower threshold. For instance, the analogue probe 14 could have a preferred measuring range, the upper and lower boundaries of which are shown by stylus positions shown in FIG. 2(*a*) as dotted lines. Accordingly, as can be seen there is a dead space 'd' (in the x-dimension) in the middle close to the stylus' rest position which is outside the preferred measuring range.

As will be understood, the same will also be the case with deflection in the y-dimension. Furthermore, in the described embodiment there is also a maximum physical deflection range in the z-axis as well as a sub-range of z-axis deflections (a preferred measuring range) within which the probe is configured to provide the most accurate results.

The dotted line 28 shown in FIG. 2(*b*) schematically illustrates the scope of the analogue probe's 14 preferred measuring range taken in the x and z dimensions. As will be understood, such a range actually extends in three dimensions, and hence is actually approximately the shape of a squashed hemisphere with a small hole cut out in the middle.

The dotted lines of FIG. 2(*c*) also schematically illustrate the preferred measuring range for a non-contact probe, such as an inductance probe. The inner and outer dotted lines represent the minimum and maximum probe/workpiece separation boundaries for optimum measuring performance. As will be understood, the preferred measuring range shown for the non-contact probe could be the entire measuring range or only a subset of the entire measuring range for the probe. As will be understood, the entire measuring range could be considered to be what can be referred to as the non-contact probe's surface detecting region.

As will be understood, the size of the preferred measuring range will vary from probe to probe. For a contact analogue probe, it could be for example not more than +/−0.8 mm in any given dimension, for example not more than +/−0.725 mm in any given dimension, for instance not more than +/−0.5 mm in any given dimension, for example in some circumstances not more than +/−0.3 mm in any given dimension (taken from the stylus rest position). Of course, there might also be a dead-zone immediately around the stylus position through which the stylus has to be deflected beyond before it enters the preferred measuring range, which could be for example not less than +/−0.2 mm in any given dimension from the stylus rest position, for instance not less than +/−0.1 mm in any given dimension from the stylus rest position, e.g. not less than +/−0.125 mm in any given dimension (again, measured from the stylus rest position).

FIG. 3 illustrates the general procedure 100 for finding a feature according to one embodiment of the invention. In this embodiment, the approximate location, e.g. the nominal location, of the feature in the machine tool's 4 workspace is known. The method begins at step 102 by generating a program which defines a course of motion that is configured to cause the probe 14 to move past the feature of the object to be found a plurality of times, with the surface detection region (i.e. the probe tip 24) at different nominal offsets relative to the feature. As will be understood, in embodiments in which the workpiece 16 can be moved as well as, or instead of the analogue probe 14 (e.g. by virtue of a movable table 15), then the program can also define a course of motion of the workpiece 16. In other words, step 102 comprises planning the relative course of motion between the analogue probe 14 and the workpiece 16 so that the analogue probe 14 can collect scanned measurement data regarding the workpiece 16 during an investigative scan.

At step 104 the program is loaded into the NC 18 via the API 26. The NC 18 is configured to interpret the program's instructions and generate motor control signals which are used to instruct the machine tool's 4 motors (not shown) so as to move the analogue probe 14 in accordance with the course of motion defined by the program. At the same time, measurement data is recorded which comprises a number of procedures. In particular, spindle position data (x, y, z) (which as mentioned above is provided by encoders on the machine tool 4) is passed to the PC 8 via the NC 18. Furthermore, probe deflection data (a, b, c) (which as mentioned above is obtained by the analogue probe) is also passed to the PC 8 via the probe transmitter/receiver interface 10. The PC 8 combines the spindle position data (x, y, z) and the probe deflection data (a, b, c) to provide a set of measurements that define the position of a surface within the machine co-ordinate geometry.

In the described embodiment, the method comprises at step 106 the NC 18 performing the first pass of the feature defined by the program. Once this has been completed, it is then determined at step 108 whether, during the pass just performed, the stylus deflected beyond a predetermined threshold amount. In the embodiment described, this is done by determining if an interrupt signal was issued during the pass just performed. Such an interrupt signal can be issued when the probe deflects beyond a predetermined threshold extent (which can be set by the user if desired). In the described embodiment, the predetermined threshold is set at the point at which the stylus is deflected so as to exceed the upper boundary of its preferred measuring range. Accordingly, in the embodiment described, only the output of the probe (and not for instance the machine tool's encoders, or a combination of the machine tool encoder data and probe data) is analysed in determining if an interrupt signal is to be issued. The interrupt signal can be issued by the transmitter/receiver interface 10 which monitors the probe deflection data and issues the interrupt signal if it determines that the probe has deflected beyond the predetermined threshold. Issuing the interrupt signal can for instance comprise changing a variable in a variable table stored on the controller 6. Accordingly, the NC 18 can interrogate the state of the variable at step 108 to determine whether the interrupt signal was issued.

If no interrupt signal was issued, then control proceeds back to step 106 at which the next pass of the object is performed, which as will be understood will be at a different nominal offset distance.

This loop continues until the interrupt signal is issued (or until the predetermined course of motion is completed at which point it is determined that the feature of the workpiece cannot be found). When it is determined that the interrupt signal has been issued, control proceeds to step 110 at which point the location of the feature is determined. The spindle position data and probe deflection data is combined so as to provide measurement data regarding the feature. This combined measurement data is then analysed to determine the precise location (and optionally the orientation) of the feature. Such analysis could for example comprise techniques which look for a particular shape of curve and for example could fit a curve to the data in order to find the location (and optionally orientation) of the edge. The determined location (and optionally orientation) can then be used to aid subsequent measurement of the feature at step 112, and optionally other features of the workpiece 16. For instance, it can be used in the generation, or alteration, of a program defining a course of motion for the probe 14 to subsequently scan the workpiece 16.

It is important to note that in this embodiment, step 108 is only performed after the completion of the whole pass. Accordingly, even if the interrupt is issued during the pass, movement of the probe continues to the end of the pass. This ensures that measurement data regarding the feature is continued to be obtained even after the interrupt signal is issued. Such measurement data can be useful in determining the precise location and/or orientation of the feature.

Embodiments of the invention will further be described with reference to FIGS. 4 and 5. FIG. 4 schematically shows the path 30 the centre point of the stylus tip 24 will take in accordance with an embodiment of the invention so as to locate an edge 42 of a blade 40. In the described embodiment, the form of the route of each pass is the same, i.e. they all comprise the analogue probe moving past the edge in a straight line, but each pass is offset relative to each other in a vertical direction (in the orientation shown). The analogue probe is configured to alternate the direction in which it moves along the passes, i.e. it moves in one direction for one of the passes and then in the opposite direction for the next pass. However, this need not necessarily be the case.

As shown, the dashed line 42' illustrates the nominal position of the edge and the solid line 42 illustrates the actual position of the edge. The stylus tip starts at the top of the path 30 as illustrated by the dotted line 24 and is moved to perform a pass of the edge 42 as illustrated by arrow A. The path 30 is configured such that it is expected that a number of passes of the feature will have to be performed before contacts with the edge 42 is made. This is so that in the event the edge is further up (in the orientation shown) the Z-axis than expected, the probe tip will still be able to perform a scan of the edge without over deflecting. However as will be understood, this need not necessarily be the case, and if gross over-deflection (e.g. beyond a maximum threshold which is greater than the threshold described above which causes the interrupt signal to issue) is detected the method could comprise a recovery action which for instance could comprise adjusting the program such that the course of motion starts higher up the Z-axis.

As shown, the actual position 42 of the edge is further down the Z-axis than expected and first contact (illustrated by the location of the probe tip 24') occurs on the sixth pass. On this pass, the stylus is deflected, but not by an amount that is greater than the threshold value. Accordingly, the seventh pass is performed which causes the stylus to deflect beyond the threshold value and the interrupt signal is issued. However, as explained above, such deflection beyond the threshold value and issuance of the interrupt signal does not immediately halt the movement of the probe. Rather, the NC 18 continues to cause the probe to be moved so as to complete the seventh pass so that the probe collects data regarding the edge 42 both before and after the threshold deflection is exceeded. It is at the end of the seventh pass that the NC 18 identifies that the interrupt signal has been issued and so takes action to ensure that future passes are not performed.

The data collected about the edge 42 on the sixth and seventh passes can be used to determine the location and optionally the orientation of the edge 42 and hence the blade 40. This could be done solely on the basis of the invention obtained from this scanning procedure, or could also use other information as well, for instance from other measuring or scanning procedures. For instance, with reference to FIG. 5, a second 50 edge finding scan could be performed. The data from this second 50 edge finding scan could be used in conjunction with the data obtained from the first 30 edge finding scan so as to obtain the position and orientation of the blade 50. Furthermore, further measurements could be obtained, such as for instance first 60 and second 70 touch measurements along the length of the blade which can provide parametric, or shape information about the blade. All this data can be used, for instance, to generate a new scan path or alter an existing scan path, for an analogue measurement probe to obtain scan data along the blade 50.

According to the above example, it is determined at temporally distinct predetermined intervals whether the analogue probe obtained scanned measurement data along the length of the object that exceeds a predetermined threshold. The analogue probe's output could for instance be continuously compared to the predetermined threshold, even during movement along a pass, to see whether it exceeds the predetermined threshold. In this case, only a quick check needs be made at the predetermined interval whether the predetermined threshold was exceeded and then make a decision of how to proceed, e.g. whether to continue along a subsequent pass or to issue an interrupt so as to stop motion along the path altogether. Optionally, the analogue probe's output is buffered, or stored, during the relative movement and all comparisons are done at the predetermined intervals.

In the example above, the predetermined intervals occur at the end of each pass. Nevertheless, this need not necessarily be the case and could for instance occur at other points in time and/or space, for instance at different intervals along the length of each pass, or at intervals that occur at (optionally whole) multiples of a number of passes, e.g. at the end of every other pass. In the described embodiments, the relative distance travelled by the analogue probe and/or object between the predetermined intervals is greater than the analogue's probe measuring range. If the measuring range is different for different dimensions, then the relative distance travelled by the analogue probe and/or object between the predetermined intervals is greater than the analogue's probe smallest measuring range.

In the described embodiment, step 108 comprises determining whether the stylus is deflected by an amount that exceeds the upper boundary of its preferred measuring range. However, this need not necessarily be the case, and could be set at a different value, e.g. at a point between its upper and lower boundaries of its preferred measuring range. Furthermore, step 108 need not comprise determining whether the stylus deflection beyond a certain amount (i.e. whether the probe obtained a certain value of data), but instead (or as well as) could configured to determine whether the probe obtained a certain quantity of data.

In the above described embodiments, whether or not to halt motion along the course of motion is determined by the controller looking at whether an interrupt signal was issued at the end of a traverse. However, this need not be the case. It could be that the controller will halt motion as soon as a signal is issued that indicates that scanned surface measurement data in accordance with at least one criterion has been collected. Of course, there will likely be some small time delay between the issuance of such a signal and the ability of the controller to halt motion (and the extent of this time delay can vary from machine to machine). In this case, the data obtained in that time between signal issue and motion halting can be obtained, e.g. which (as explained above) can be used to determine information about the object/feature. It might be preferable to implement a technique whereby a minimum amount of extra analogue probe data is obtained after issuing such a signal. In this case, it might be that the issuance of the signal is delayed such that analogue probe data after issuance of such a signal can be obtained. For example, if an interface 10 is present and is analysing the analogue probe's output, it might delay issuing a trigger signal to the controller 6 until a predetermined amount of time has passed. In other cases, it might be that the controller is unable to deal with such signals immediately, but instead the controller queries whether such a signal has been issued at regular and/or predetermined intervals. For instance, if an interface 10 is present, the controller 6 might query the interface 10 to see if such a signal has been issued. Again, the analogue probe data between such a signal being issued and the controller halting motion in response to the signal can be obtained, e.g. to determine information about the object/feature.

As will be understood, in accordance with the above described embodiments, the course of motion which the analogue probe is configured to follow is configured such that the analogue probe is initially not in a position sensing relationship (and is not in contact with) the object/feature to be found. Depending on the actual position of the object, it might be that the analogue probe comes into a position sensing relationship with the object/feature to be found (e.g. in the case of a contact probe, contacts the object/feature to be found) on the first traverse, even though the course of motion is configured with a plurality of traverses. In this case, it might be that only the first traverse is performed, even though the course of motion is configured with a plurality of subsequent traverses.

In the above described embodiments, the part finding operation can be performed at high speed (e.g. with the workpiece sensing part (e.g. the stylus tip 24) and object travelling relative to each other at least at 16 mm/s, preferably at least at 25 mm/s, more preferably at least at 50 mm/s, especially preferably at least at 100 mm/s, for example at least at 250 mm/s).

The invention claimed is:

1. A method of finding an object using an analogue probe mounted on a machine tool, the method comprising causing the analogue probe and/or object to follow a course of motion which is configured such that the analogue probe is initially sufficiently far away from the object such that the analogue probe is not in a position sensing relationship with anything and the course of motion is configured to cause the analogue probe's surface sensing region to traverse past the object to be found a plurality of times whilst approaching the object over successive traverses so as to ultimately arrive in a position sensing relationship with the object so as to collect scanned measurement data about the object along at least part of a traverse.

2. A method as claimed in claim 1, comprising halting movement along the course of motion in response to it being determined that scanned surface measurement data in accordance with at least one criterion has been collected.

3. A method as claimed in claim 2, comprising halting movement at some point after scanned surface measurement data in accordance with the at least one criterion has been collected.

4. A method as claimed in claim 3, in which the surface sensing region continues along its traverse after the scanned surface measurement data in accordance with the predetermined criterion has been collected, until a subsequent predetermined condition has been met.

5. A method as claimed in claim 4, in which the subsequent predetermined condition is that the course of motion has reached a predetermined point.

6. A method as claimed in claim 5, in which the predetermined point is that point at which the surface sensing region reaches an end of the traverse in which the first predetermined criterion was met.

7. A method as claimed in claim 2, in which the at least one criterion is a predetermined threshold indicative of the analogue probe obtaining a minimum level of data regarding the object.

8. A method as claimed in claim 2, in which it is determined at predetermined intervals whether the analogue probe obtained scanned surface measurement data along the surface of the object.

9. A method as claimed in claim 8, in which at the predetermined intervals, the analogue probe's output collected prior to the predetermined interval is analysed to determine whether the analogue probe obtained scanned object measurement data, prior to resumption of relative movement along the path.

10. A method as claimed in claim 1, in which movement is halted immediately in response to it being determined that scanned surface measurement data in accordance with at least one second criterion has been collected.

11. A method as claimed in claim 10, in which the at least one second criterion comprises a magnitude of data output by the analogue probe which is indicative of an undesirable positional relationship of the object and analogue probe.

12. A method as claimed in claim 1, in which the difference between previous and subsequent traverses is sufficiently small such that if along the previous traverse no surface measurement data was obtained, the subsequent traverse will not cause the analogue probe to exceed its measurement range.

13. A method as claimed in claim 1, in which it is determined whether the analogue probe obtained scanned measurement data based solely on the data from the analogue probe.

14. A method as claimed in claim 1, comprising determining the location and/or orientation of the object based on the scanned measurement data obtained.

15. A method as claimed in claim 1 in which the analogue probe is a contact scanning probe comprising a deflectable stylus for contacting the object.

16. A method as claimed in claim 1, in which the method comprises finding an edge of the object.

17. A non-transitory computer readable medium comprising instructions which when executed by a machine tool apparatus causes the machine tool apparatus to perform the method of claim 1.

18. A method as claimed in claim 1, wherein the analogue probe traverses past the object over a plurality of successive traverses before approaching the object.

19. A method of finding an object using an analogue probe mounted on a machine tool, the method comprising
moving the analogue probe to an initial position sufficiently far away from the object by an offset distance such that the analogue probe is not in a position sensing relationship with anything,
moving the analogue probe and/or object back and forth along a scanning path which is configured to move the feature of the object and the analogue probe past each other,
at predetermined intervals determine whether the analogue probe obtained scanned measurement data along the surface of the object that exceeds a predetermined threshold indicative of the analogue probe obtaining a minimum level of data regarding the object,
gradually reducing the offset distance of the scanning path until the obtained scanned measurement data exceeds the predetermined threshold, and
subsequently taking action based on the result of said determination.

20. A method as claimed in claim 19, wherein the gradually reducing is a stepwise reduction of the offset distance between the back and forth movement along the scanning path.

21. A method as claimed in claim 19, wherein the gradually reducing is a continuous reduction of the offset distance, resulting in a zigzag scanning path.

22. A machine tool apparatus comprising a machine tool, an analogue probe mounted on the machine tool, and a controller configured to control the relative movement of the analogue probe and an object to find said object, the controller being configured to control the analogue probe and/or object to follow a course of motion which causes the analogue probe's surface sensing region to, from a starting position initially sufficiently far away from the object such that the analogue probe is not in a position sensing relationship with anything, traverse past the object to be found a plurality of times whilst approaching the object over successive traverses so as to ultimately arrive in a position sensing relationship with the object so as to collect scanned measurement data about the object along at least part of a traverse.

23. A method of finding an object using an analogue probe mounted on a machine tool, the method comprising the steps of:
 a scanning step comprising scanning to find the object using the analogue probe by causing the analogue probe and/or object to follow a course of motion along a scanning path, the scanning path configured such that the scanning path is offset in a first direction from the object so that initially the analogue probe is not in a position sensing relationship with anything;
 an adjusting step comprising adjusting the scanning path in the first direction such that the offset is reduced by an incremental amount;
 alternating between the scanning step and the adjusting step until a surface sensing region of the analogue probe is in a position sensing relationship with the object so as to collect scanned measurement data about the object along at least part of a scanning step.

24. A method as claimed in claim 23, wherein the analogue probe traverses past the object over a plurality of successive traverses before approaching the object.

* * * * *